United States Patent [19]
Whitman

[11] Patent Number: 5,439,589
[45] Date of Patent: Aug. 8, 1995

[54] SEALING MEANS FOR SLIDE PLATE SCREEN CHANGER

[75] Inventor: Timothy W. Whitman, Hamilton, Mass.

[73] Assignee: Trafalgar House Inc., South Attleboro, Mass.

[21] Appl. No.: 239,736

[22] Filed: May 9, 1994

[51] Int. Cl.6 ............................................. B01D 29/96
[52] U.S. Cl. ..................... 210/436; 210/447; 210/450; 425/197; 277/27
[58] Field of Search ........... 210/236, 447, 450; 425/197–199; 277/71, 75, 79, 27

[56] References Cited

U.S. PATENT DOCUMENTS

| | | | |
|---|---|---|---|
| 2,264,147 | 11/1941 | Dunlevy | 288/5 |
| 2,705,177 | 3/1955 | Waring | 309/23 |
| 2,998,288 | 8/1961 | Newhouse | 309/4 |
| 3,425,716 | 2/1969 | Blau | 285/110 |
| 3,490,525 | 1/1970 | Nettles | 166/97 |
| 3,572,734 | 3/1971 | Holt | 277/205 |
| 3,675,934 | 7/1972 | Heston | 210/447 |
| 3,856,277 | 12/1974 | Tiramani | 210/447 |
| 3,962,092 | 6/1976 | Newman, Jr. | 210/236 |
| 4,053,166 | 10/1977 | Domkowski | 277/152 |
| 4,410,189 | 10/1983 | Myers et al. | 277/117 |
| 4,494,921 | 1/1985 | Sowell | 425/198 |
| 4,592,558 | 6/1986 | Hopkins | 277/205 |
| 4,618,154 | 10/1986 | Freudenthal | 277/205 |
| 5,246,236 | 9/1993 | Szarka et al. | 277/117 |

*Primary Examiner*—Matthew O. Savage
*Attorney, Agent, or Firm*—Lahive & Cockfield

[57] ABSTRACT

Sealing means for use in the upstream passage of a slide plate screen changer, comprising a ring-shaped seal for contact with the slide plate, a pliable ring and a sleeve. A cavity external to the passage is formed by the seal, the sleeve and a shoulder on the body defining the passage. The pliable ring substantially fills and is confined by the cavity. The sleeve forms an aperture communicating between the passage and the cavity to transmit the pressure in the passage to the pliable ring.

10 Claims, 4 Drawing Sheets

SEALING MEANS FOR SLIDE PLATE SCREEN CHANGER

SUMMARY OF THE INVENTION

This invention relates generally to slide plate screen changers used in the polymer industry for filtration of heated, pressurized polymer in liquid form as it flows between an extruder screw and any of various types of forming equipment. More particularly, the invention is directed to the means employed for sealing the surfaces of the slide plate to prevent the entry of polymer into the transverse filter channel through which it moves.

Screen changers of this type include a body defining upstream and downstream polymer flow passages and a filter channel transverse to the flow direction in which the slide plate is movable. On the downstream side of the slide plate the body has an annular sealing surface communicating between the filter channel and the downstream passage. This sealing surface is formed in the body or on a ring shaped element fixed in the body. The slide plate has opposed upstream and downstream bearing surfaces, the downstream surface bearing on the aforementioned sealing surface. On the upstream side of the slide plate a rigid ring shaped seal bears upon it and is slidable on an annular surface of the body.

Various means are provided for applying axial force to the upstream seal and through the seal to the bearing surface of the slide plate. Commonly, this force is produced by the pressure of the flowing polymer on an exposed surface of the seal. Since this surface must have a substantial projection upon a plane transverse to the flow passages, the configuration of the seal creates a cavity or dead space in which polymer can become trapped, retained and ultimately degraded. The conventional method of avoiding this problem is to insert in this cavity a pliable polymer ring conforming to the shape of the cavity and providing a smooth, continuous wall within the upstream passage. This polymer ring is typically a material that retains a solid but pliable form at the temperature of the flowing polymer. The pliable ring, being exposed to the flowing polymer, transmits the polymer pressure to a face of the seal, the resulting force being sufficient to seal the upstream and downstream bearing surfaces of the slide plate.

In the prior art configurations, use of the pliable polymer ring over a period of time has frequently resulted in its deformation, ultimate dislodgment from the cavity, and possible destruction. Deformation is the direct result of the high pressures and temperatures of the flowing polymer and the tendency of the pliable ring to extrude radially inwardly through its interface with the flowing polymer. The seal itself does not materially resist such movement. In many embodiments the problem is further aggravated by the extruder screw rotating in close proximity to the pliable ring. When the latter has moved partially into the polymer stream, the extruder screw collides with it and forces it completely out of its cavity.

With a view to overcoming the foregoing problems, this invention features improved seal means comprising a rigid ring shaped seal element, a sleeve and a pliable ring that is substantially confined while retaining sufficient exposure to the flowing polymer pressure to transmit axial sealing pressure forces through the seal to the slide plate.

The pliable ring substantially fills and is confined by a cavity formed by the seal, the sleeve and a shoulder on the body which defines the upstream passage. Thus it is prevented from dislodgment into the polymer flow stream even after extended use.

The sleeve is formed to provide an aperture communicating between the upstream passage and the cavity, thus transmitting pressure to the pliable ring.

Other features will be evident from the following description of a preferred embodiment and alternative embodiments of the invention.

DRAWING

DETAILED DESCRIPTION

Figure 1:
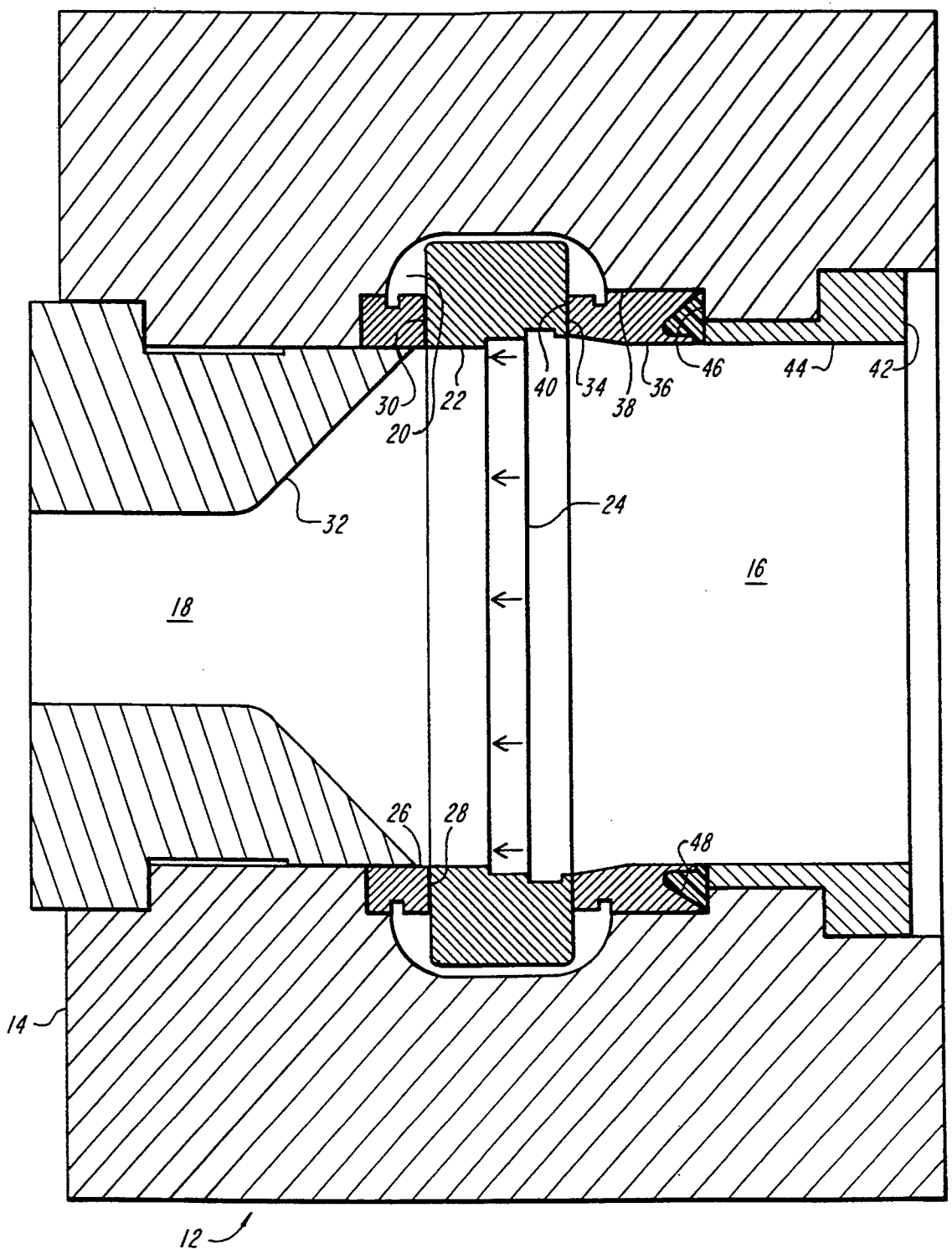
FIG. 1 is an elevation in section of a screen changer having seal means according to the presently preferred embodiment of the invention.

In the drawings, like reference numerals designate like elements in the several embodiments shown. FIG. 1 illustrates the principal parts of a screen changer having seal means according to the present invention. The screen changer, depicted generally at 12 has a body 14 shown for simplicity as a single piece, although in practice it may comprise a number of pieces secured together. The body 14 is of conventional form defining an upstream passage 16 and a downstream passage 18. The body is provided with suitable means (not shown) for connection of the upstream passage to a polymer extruder and the downstream passage 18 to polymer forming apparatus. A filter channel 20 extends through the body transversely of the polymer flow passages (i.e., in a direction normal to the plane of the drawing) to permit the introduction and removal of one or a succession of slide plates 22, each bearing a filter 24. The filter 24 contains small apertures through which the polymer flows in the direction of the arrows shown.

A downstream seal ring 26 is fitted in an annular groove in the body 14 and provides a downstream sealing surface 28 which contacts and conforms to a downstream bearing surface 30 of the slide plate. The seal 26 is retained by an annular downstream channel member 32 secured in one end of the body 14.

The slide plate 22 has an annular upstream bearing surface 34 opposite the surface 30. A rigid seal ring 36 has a cylindrical peripheral surface slidingly fitted in an axially extending cylindrical surface 38 of the body 14 adjacent the slide plate. The surface 38 is referred to herein as the "first surface" of the body. The ring 36 has an annular upstream sealing surface 40 in contact and conforming with the upstream bearing surface 34 of the slide plate.

A sleeve 42 of stepped cylindrical configuration is received on an inwardly projecting shoulder of the body 14. The sleeve 42 is secured in any convenient manner to the body 14 and has a cylindrical inner surface 44 defining the upstream channel 16. The surface 44 is referred to herein as the "second surface" of the body. The second surface 44 has a smaller diameter than that of the first surface 38, thus forming a shoulder 46 facing the bearing plate. The sleeve 42 preferably extends to an end coplanar with the portion of the shoulder 46 formed on the body 14, as more clearly shown in the detail of FIG. 2. If desired, the sleeve 42 can be integral with the body 14.

The ring shaped seal 36 partially defines a cavity 48, the cavity being bounded on one side by the shoulder 46. The seal in this embodiment has an integral sleeve extension 50 having the same inner diameter as the surface 44, thus forming a smooth continuation of the wall of the upstream channel 16. The sleeve extension 50 extends to an end forming an aperture 52 between the sleeve and the shoulder 46.

A pliable ring 54 is formed substantially in the same configuration as that of the cavity 48 and extends into the gap 52. The ring 54 consists of a suitable pliable polymeric material, for example a polytetrafluoroethylene selected to be solid but pliable at the temperature and pressure of the flowing polymer. In cross section the ring 54 comprises a triangular portion defined by the sleeve extension 50, the shoulder 46 and a sloping surface 56 of the seal 36. The portion of the ring 54 in the aperture 52 communicates between the upstream passage 16 and this triangular portion.

Figure 2:
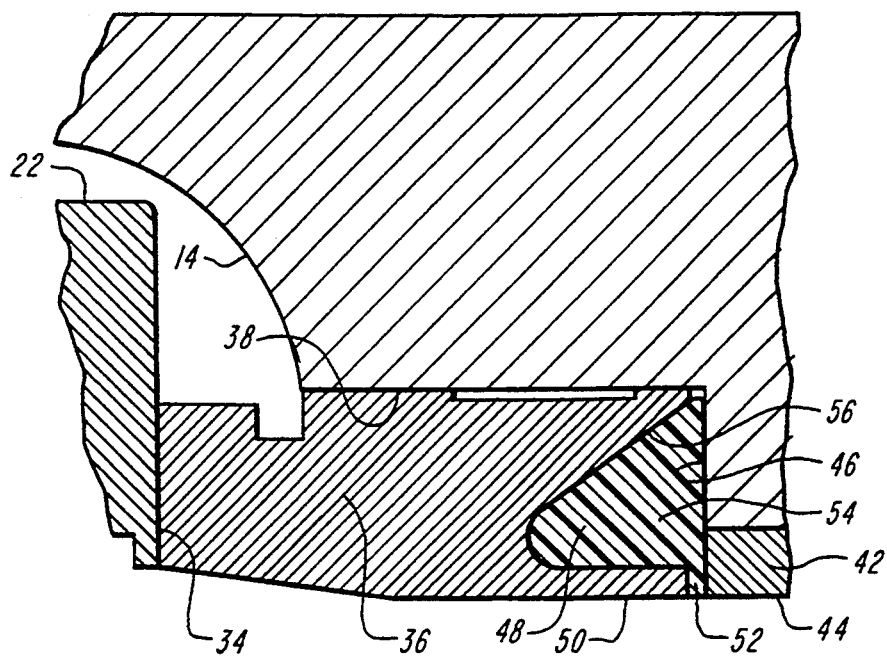
FIG. 2 is an enlarged fragmentary detail of the embodiment of FIG. 1.

In use as assembled and as shown in FIGS. 1 and 2, the pressure of the flowing polymer in the upstream passage 16 is communicated through the aperture 52 to the triangular portion of the pliable ring 54, and through this portion to the surface 56 of the seal 36. Since the surface 56 has a projection upon a plane normal to the flow axis of the screen changer, the transmitted pressure produces a force component in the direction of the flow axis, thus effectively sealing the surfaces 30 and 34 of the slide plate.

The axial dimension of the aperture 52 is chosen to be sufficient to ensure effective pressure communication of the flowing polymer to the triangular portion of the ring 54. The sleeve extension 50 confines the ring 54 in the cavity 48 so that it is prevented from dislodgment into the upstream passage 16.

Figure 3:
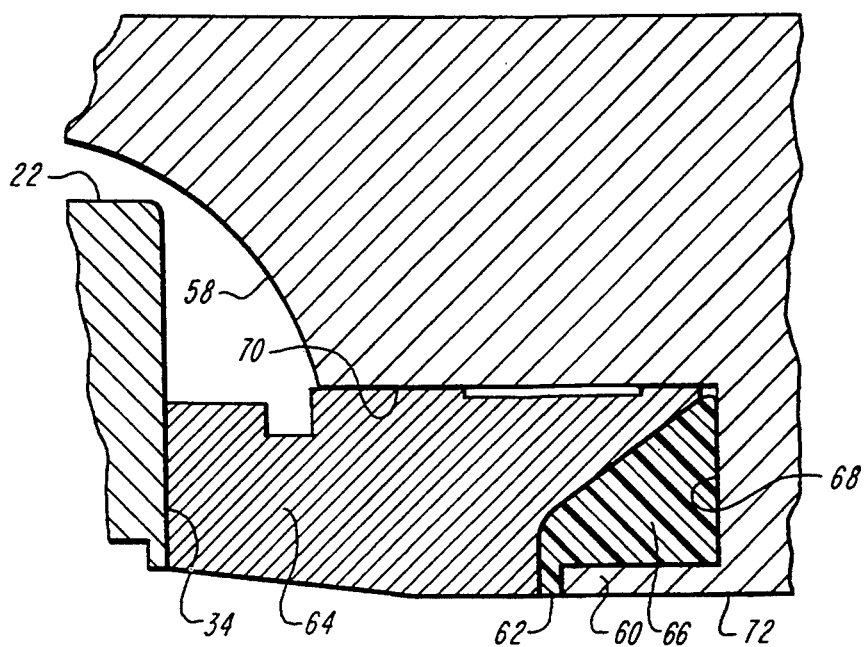
FIG. 3 is a fragmentary detail similar to FIG. 2 illustrating a first alternative embodiment of the invention.

A first alternative embodiment of the invention is illustrated in FIG. 3. A body 58 of the screen changer has an integral sleeve extension 60 that performs a function similar to that of the sleeve extension 50 in FIGS. 1 and 2. The sleeve extension 60 is formed to provide an aperture 62 adjacent to a ring shaped seal 64. A pliable ring 66 corresponds to the ring 54 of FIGS. 1 and 2 except that it is formed to substantially fill the cavity formed between the seal 64, the sleeve extension 60 and a shoulder 68 extending from a first surface 70 on the body 58 toward a second surface 72 defined by the body. In operation, the embodiment of FIG. 3 provides advantages similar to those of the embodiment of FIGS. 1 and 2.

Figure 4:
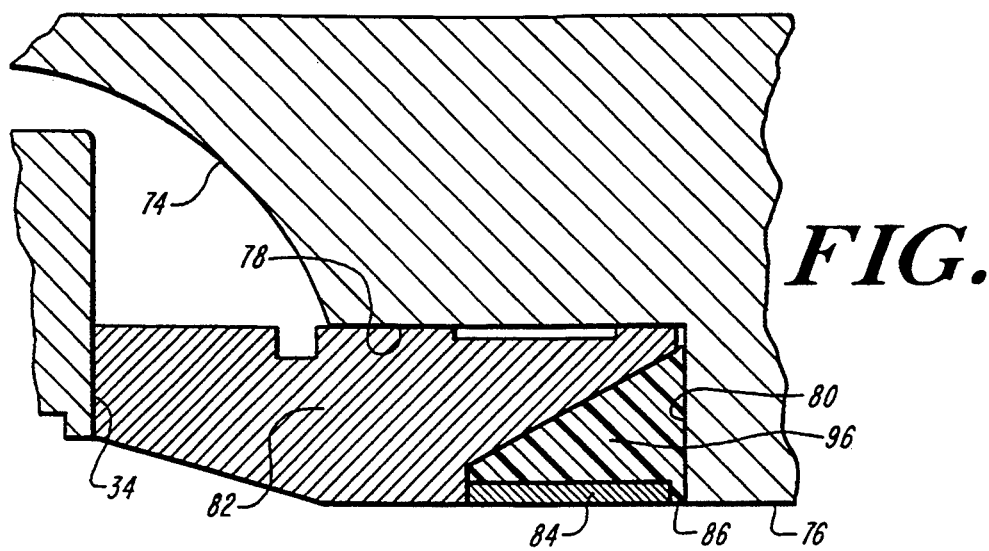
FIGS. 4 to 6 are fragmentary details similar to FIG. 2 illustrating second, third and fourth alternative embodiments of the invention, respectively.
Figure 5:
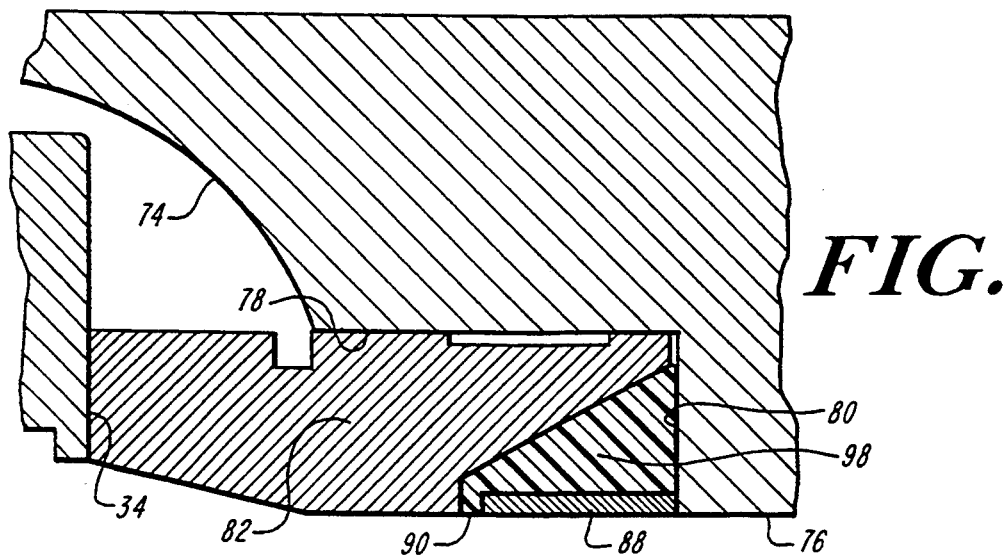
Figure 6:
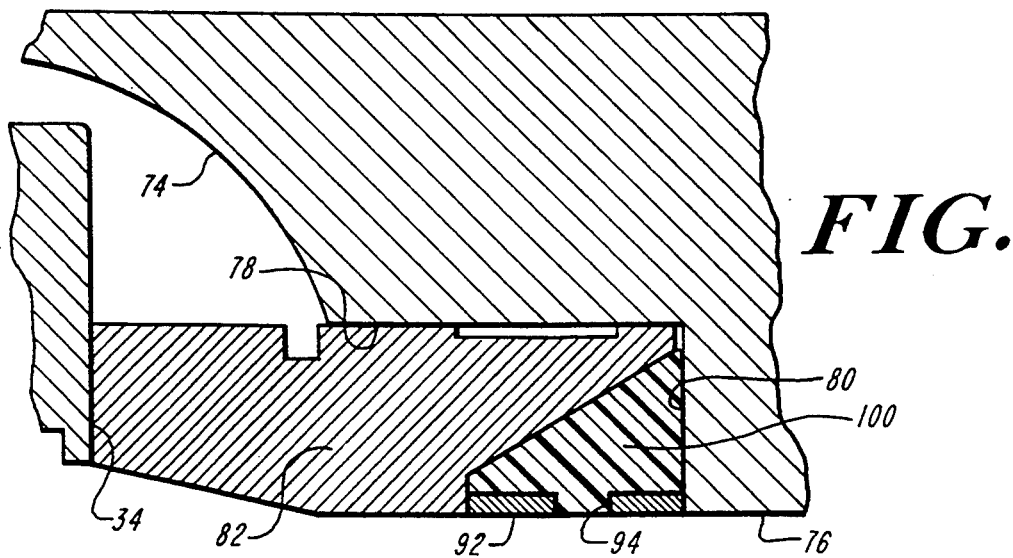

In the alternative embodiments of FIGS. 4 to 6 the sleeve that partially defines the cavity and acts to confine the pliable ring is an element separate from the seal and the body of the screen changer. Each of these embodiments may comprise a body 74 similar to the body 14 of FIGS. 1 and 2 except that a separate sleeve 42 is replaced by an integral portion of the body forming the "second surface" 76 thereof. The body has a "first surface" 78 of larger diameter, thus forming a shoulder 80 therebetween. A ring shaped seal element 82 of similar shape is employed in each of these three embodiments.

In the embodiment of FIG. 4 a sleeve 84 abuts the seal 82 and forms an aperture 86 adjacent the shoulder 80.

In the embodiment of FIG. 5 a sleeve 88 abuts the shoulder 80 and forms an aperture 90 adjacent the seal 82.

In the embodiment of FIG. 6 a sleeve 92 abuts both the shoulder 80 and the seal 82 and has one or more perforations 94.

The embodiments of FIGS. 4 to 6 are each provided with corresponding pliable rings 96, 98 and 100, each suitably formed to fill the cavity defined by the seal 82, the corresponding sleeve and the shoulder 80. In each of these embodiments the pliable ring may be formed separately from the sleeve with the pliable ring and sleeve assembled as separate elements, or they may be bonded together as a subassembly prior to insertion in the screen changer. Alternatively, the pliable ring in these embodiments may be formed in a mold in which the sleeve has been assembled so that the pliable ring and sleeve are bonded in the molding process. Preferably, the material forming the pliable ring extends into the apertures 86, 90 and 94 in order to provide a smooth continuation of the surface of the upstream flow passage 16.

Figure 7:
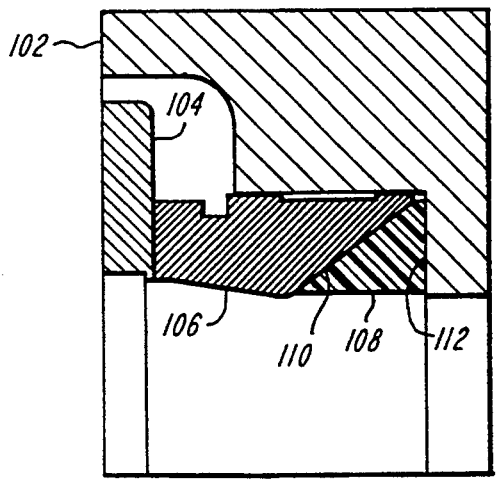
FIG. 7 is a fragmentary illustration showing the configuration of a typical prior art seal and its cooperating pliable polymer ring, shown installed in a screen changer prior to use.
Figure 8:
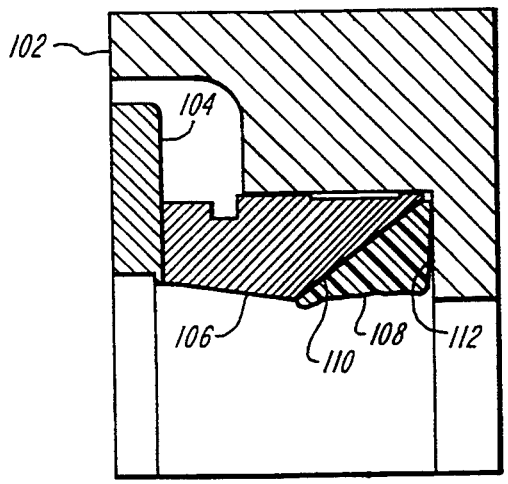
FIG. 8 is an illustration similar to FIG. 7 showing the pliable polymer ring after a period of use.
Figure 9:
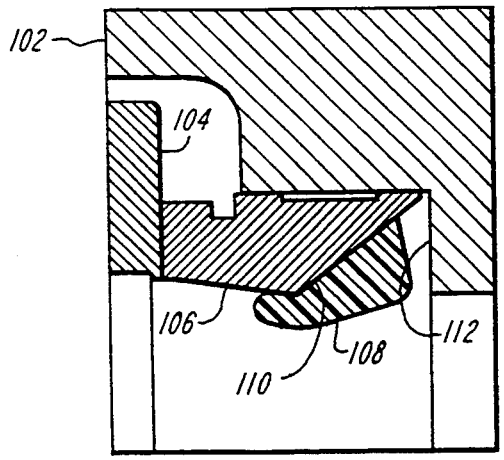
FIG. 9 is an illustration similar to FIG. 7 showing the pliable polymer ring after long-term use.

FIGS. 7 to 9 illustrate a prior art embodiment of seal means and the problem of displacement of the pliable ring which is overcome by the present invention. The screen changer has a body 102 which is similar in all material respects to the body 14. A slide plate 104 is also similar in all material respects to the slide plate 22. A conventional ring shaped seal 106 is employed. A pliable ring 108, as initially installed, has a substantially triangular cross sectional configuration as shown in FIG. 7, substantially filling a recess formed between an inclined surface 110 of the seal and a shoulder 112 corresponding to the shoulder 46 of FIGS. 1 and 2.

FIG. 8 illustrates the change that occurs in the cross section of the pliable ring 108 after an initial period of use. As shown, the flowing polymer pressure has begun to distort the ring and to cause a portion to be displaced inwardly of the upstream flow passage.

FIG. 9 shows the configuration of the ring 108 after extended use, with further distortion of the cross section and further dislodgment of the ring into the polymer flow passage. It is noted that the surface 110 of the seal 106, being inclined inwardly in the direction of the polymer flow, provides no effective resistance to the illustrated inward displacement of the pliable ring 108.

In the several embodiments of FIGS. 1 to 6 the seal 36 is shown or may be fabricated of cylindrical configuration and the sealing surface of the seal in contact with the bearing surface 34 is or may be of circular configuration. However, these configurations are not inherent in the present invention, and may be altered by design to oval, kidney, rectangular or other shapes, if desired. Likewise, the bearing surfaces 30 and 34 of the slide plate and the conforming sealing surfaces 28 and 40 of the seals 26 and 36, respectively, are shown as being flat and mutually parallel. These configurations may also be altered by design, provided that each pair of contacting surfaces is mutually conforming, and that each surface has a substantial projection on a plane normal to the polymer flow direction. The term "closed annular," as used herein with reference to sealing and bearing surfaces, is intended to cover all configurations that provide a closed surface for sealing purposes. Likewise, the term "ring shaped" is intended to cover all elements having a closed configuration providing a surface for the sealing purposes described.

I claim:

1. In combination with a screen changer comprising a body forming upstream and downstream passages defining a fluid flow direction, having a filter channel extending transversely of said direction and having a closed annular downstream sealing surface extending between said channel and the downstream passage, and a slide plate movable through the filter channel, having opposed, closed annular upstream and downstream bearing surfaces and supporting a filter therebetween, the downstream bearing surface being in annular contact with the downstream sealing surface, the body a closed annular first surface located on the upstream side of the slide plate, said first surface having a uniform cross section in said direction, the body having a closed annular second surface forming a wall portion of the upstream passage and a shoulder facing the slide plate and extending between said first and second surfaces, seal means comprising, in combination, a rigid ring shaped seal having a closed annular surface slidingly fitting said first surface and an upstream sealing surface in annular contact with the upstream bearing surface, a ring shaped sleeve located between the shoulder and the slide plate, having an inner annular surface forming a wall portion of the upstream passage and having an outer annular surface, the seal means being formed to define a ring shaped cavity external to the upstream passage and enclosed by the seal, said outer annular surface and the shoulder, and a pliable ring substantially filling and being confined by the cavity, the sleeve being formed to provide at least one aperture for transmitting upstream passage pressure to the pliable ring, whereby the pliable ring transmits said pressure to the seal in said direction.

2. The combination of claim 1, in which the sleeve is integral with the seal.

3. The combination of claim 1, in which the sleeve is integral with the body.

4. The combination of claim 1, in which said aperture is formed between an end of the sleeve and the seal.

5. The combination of claim 1, in which said aperture is formed between an end of the sleeve and the shoulder.

6. The combination of claim 1, in which said aperture comprises a perforation in the sleeve.

7. The combination of claim 1, in which the sleeve is bonded to the pliable ring.

8. The combination of claim 1, in which the seal has an inner surface forming a wall portion of the upstream passage, said wall portions formed by the second surface, sleeve and seal forming a smoothly continuous passage wall.

9. The combination of claim 8, in which the sleeve is integral with the seal.

10. The combination of claim 8, in which the sleeve is integral with the body.

* * * * *

UNITED STATES PATENT AND TRADEMARK OFFICE
CERTIFICATE OF CORRECTION

PATENT NO.    :   5,439,589
DATED         :   August 8, 1995
INVENTOR(S)   :   Timothy W. Whitman It is certified that error appears in the above-identified patent and that said Letters Patent is hereby corrected as shown below:

Column 5, (claim 1), line 16, after "body" insert --having--

Signed and Sealed this

Third Day of October, 1995

Attest:

BRUCE LEHMAN

Attesting Officer                Commissioner of Patents and Trademarks